(12) United States Patent
Dietrich et al.

(10) Patent No.: US 8,204,512 B2
(45) Date of Patent: *Jun. 19, 2012

(54) WIRELESS NODE LOCATION MECHANISM FEATURING DEFINITION OF SEARCH REGION TO OPTIMIZE LOCATION COMPUTATION

(75) Inventors: Paul F. Dietrich, Seattle, WA (US); Gregg Scott Davi, Milpitas, CA (US); Robert J. Friday, Los Gatos, CA (US)

(73) Assignee: Cisco Technology, San Jose, CA (US)

( * ) Notice: Subject to any disclaimer, the term of this patent is extended or adjusted under 35 U.S.C. 154(b) by 780 days.

This patent is subject to a terminal disclaimer.

(21) Appl. No.: 12/181,576

(22) Filed: Jul. 29, 2008

(65) Prior Publication Data

US 2008/0285530 A1    Nov. 20, 2008

Related U.S. Application Data

(63) Continuation of application No. 10/848,276, filed on May 18, 2004, now Pat. No. 7,433,696.

(51) Int. Cl.
*H04W 24/00* (2009.01)
(52) U.S. Cl. .......... 455/456.2; 455/456.1; 455/423; 455/67.11; 455/446; 370/338
(58) Field of Classification Search .... 455/456.1–456.6, 455/67.11–67.16, 423–425, 562.1, 446; 370/328, 370/338
See application file for complete search history.

(56) References Cited

U.S. PATENT DOCUMENTS

| | | | |
|---|---|---|---|
| 4,254,467 A | 3/1981 | Davis et al. | |
| 5,028,848 A | 7/1991 | Bankston | |
| 5,063,371 A | 11/1991 | Oyer | |
| 5,095,500 A * | 3/1992 | Tayloe et al. | 379/32.01 |
| 5,179,722 A * | 1/1993 | Gunmar et al. | 455/446 |
| 5,327,144 A | 7/1994 | Stilp et al. | |

(Continued)

FOREIGN PATENT DOCUMENTS

EP    0930514    7/1999

(Continued)

OTHER PUBLICATIONS

2005800130930, State Intellectual Property Office of the People's Republic of China, "Text of the First Office Action," p. 1-3.

(Continued)

*Primary Examiner* — Sharad Rampuria
(74) *Attorney, Agent, or Firm* — Baker Botts L.L.P.

(57) ABSTRACT

A wireless node location mechanism that defines a search region to optimize the computations associated with estimating the location of a given wireless node. According to one implementation, a coverage map associated with each radio receiver that records signal strength data is defined out to a threshold signal strength level. Before computing the estimated location of a given wireless nodes, a search region is defined based on the intersection of the coverage maps associated with each radio receiver that detects the wireless node. Some implementations use information provided by the fact that certain radio receivers did not detect the wireless node to further optimize the location estimate. By defining a search region, which is a generally small area relative to the space encompassed by an entire RF environment, the present invention provides several advantages, such as reducing the processing time and/or power to compute estimated locations for wireless nodes.

20 Claims, 8 Drawing Sheets

U.S. PATENT DOCUMENTS

| | | | |
|---|---|---|---|
| 5,335,246 A | 8/1994 | Yokev et al. | 375/133 |
| 5,375,140 A | 12/1994 | Bustamante et al. | |
| 5,394,158 A | 2/1995 | Chia | |
| 5,396,582 A | 3/1995 | Kahkoska | |
| 5,463,673 A * | 10/1995 | Herscovici | 455/446 |
| 5,491,692 A | 2/1996 | Gunner et al. | |
| 5,508,707 A * | 4/1996 | LeBlanc et al. | 342/457 |
| 5,548,818 A * | 8/1996 | Sawyer et al. | 455/515 |
| 5,561,841 A * | 10/1996 | Markus | 455/446 |
| 5,564,079 A | 10/1996 | Olsson | |
| 5,570,412 A | 10/1996 | LeBlanc | |
| 5,666,662 A | 9/1997 | Shibuya | |
| 5,684,860 A | 11/1997 | Milani | |
| 5,717,406 A | 2/1998 | Sanderford et al. | |
| 5,732,354 A | 3/1998 | MacDonald | |
| 5,749,044 A | 5/1998 | Natarajan et al. | |
| 5,809,059 A | 9/1998 | Souissi et al. | 375/133 |
| 5,842,130 A * | 11/1998 | Oprescu-Surcobe et al. | 455/456.2 |
| 5,940,384 A | 8/1999 | Carney et al. | |
| 5,945,948 A | 8/1999 | Buford et al. | |
| 6,006,096 A | 12/1999 | Trompower | 455/456 |
| 6,097,956 A | 8/2000 | Veeravalli et al. | |
| 6,104,928 A | 8/2000 | Waugh | |
| 6,112,095 A | 8/2000 | Wax et al. | |
| 6,115,605 A | 9/2000 | Siccardo et al. | |
| 6,134,338 A | 10/2000 | Solberg et al. | |
| 6,134,448 A | 10/2000 | Shoji et al. | |
| 6,140,964 A | 10/2000 | Sugiura et al. | |
| 6,167,274 A | 12/2000 | Smith | |
| 6,175,739 B1 | 1/2001 | Ishii et al. | 455/452.1 |
| 6,198,935 B1 | 3/2001 | Saha et al. | |
| 6,208,629 B1 | 3/2001 | Jaszewski et al. | 370/329 |
| 6,212,391 B1 | 4/2001 | Saleh et al. | |
| 6,223,028 B1 | 4/2001 | Chang et al. | |
| 6,226,400 B1 | 5/2001 | Doll | |
| 6,236,365 B1 | 5/2001 | LeBlanc et al. | |
| 6,240,077 B1 | 5/2001 | Vuong et al. | |
| 6,243,413 B1 | 6/2001 | Beukema | |
| 6,243,811 B1 | 6/2001 | Patel | |
| 6,249,252 B1 | 6/2001 | Dupray | |
| 6,269,246 B1 | 7/2001 | Rao et al. | |
| 6,272,541 B1 | 8/2001 | Cromer et al. | |
| 6,275,190 B1 | 8/2001 | Sugiura et al. | |
| 6,282,427 B1 | 8/2001 | Larsson et al. | |
| 6,286,038 B1 | 9/2001 | Reichmeyer et al. | 709/220 |
| 6,304,218 B1 | 10/2001 | Sugiura et al. | |
| 6,317,599 B1 | 11/2001 | Rappaport et al. | |
| 6,317,604 B1 | 11/2001 | Kovach et al. | |
| 6,338,140 B1 | 1/2002 | Owens et al. | 713/168 |
| 6,393,294 B1 | 5/2002 | Perez-Breva et al. | 455/456.5 |
| 6,414,634 B1 | 7/2002 | Tekinay | |
| 6,415,155 B1 | 7/2002 | Koshima et al. | |
| 6,441,777 B1 | 8/2002 | McDonald | |
| 6,456,892 B1 | 9/2002 | Dara-Abrams et al. | |
| 6,473,038 B2 | 10/2002 | Patwari et al. | |
| 6,522,888 B1 * | 2/2003 | Garceran et al. | 455/456.3 |
| 6,526,283 B1 | 2/2003 | Jang | |
| 6,556,942 B1 | 4/2003 | Smith | |
| 6,581,000 B2 | 6/2003 | Hills et al. | |
| 6,643,278 B1 | 11/2003 | Panasik et al. | 370/330 |
| 6,664,925 B1 | 12/2003 | Moore et al. | |
| 6,674,403 B2 | 1/2004 | Gray et al. | |
| 6,704,352 B1 | 3/2004 | Johnson | |
| 6,728,782 B1 | 4/2004 | D'Souza et al. | |
| 6,754,488 B1 | 6/2004 | Won et al. | 455/424 |
| 6,760,318 B1 | 7/2004 | Bims | |
| 6,760,599 B1 | 7/2004 | Uhlik | 455/525 |
| 6,766,453 B1 | 7/2004 | Nessett et al. | |
| 6,771,609 B1 | 8/2004 | Gudal | |
| 6,788,658 B1 | 9/2004 | Bims | |
| 6,799,046 B1 | 9/2004 | Tang | 455/456.1 |
| 6,799,047 B1 | 9/2004 | Bahl et al. | 455/456.1 |
| 6,804,394 B1 | 10/2004 | Hsu | |
| 6,810,428 B1 | 10/2004 | Larsen et al. | |
| 6,850,946 B1 | 2/2005 | Rappaport et al. | |
| 6,904,280 B2 * | 6/2005 | Siegel | 455/431 |
| 6,917,819 B2 | 7/2005 | Collins | |
| 6,925,069 B2 | 8/2005 | Koos et al. | |
| 6,925,070 B2 | 8/2005 | Proctor | |
| 6,954,800 B2 | 10/2005 | Mallory | 709/240 |
| 6,961,583 B2 * | 11/2005 | Moles et al. | 455/552.1 |
| 6,990,428 B1 | 1/2006 | Kaiser et al. | 702/150 |
| 7,024,188 B2 | 4/2006 | Khun-Jush et al. | 455/423 |
| 7,116,988 B2 | 10/2006 | Dietrich et al. | 455/456.1 |
| 7,123,924 B2 | 10/2006 | Cuffaro | |
| 7,133,909 B2 | 11/2006 | Bahl | |
| 7,212,837 B1 | 5/2007 | Calhoun | |
| 7,260,408 B2 | 8/2007 | Friday et al. | |
| 7,286,833 B2 | 10/2007 | Friday et al. | |
| 7,301,926 B1 | 11/2007 | Dietrich et al. | |
| 7,312,752 B2 * | 12/2007 | Smith et al. | 342/464 |
| 7,327,697 B1 | 2/2008 | Friday et al. | |
| 7,340,247 B1 | 3/2008 | O'Hara et al. | |
| 7,346,338 B1 | 3/2008 | Calhoun et al. | |
| 7,433,696 B2 * | 10/2008 | Dietrich et al. | 455/456.2 |
| 2001/0016489 A1 | 8/2001 | Haymes | |
| 2002/0036569 A1 | 3/2002 | Martin | |
| 2002/0045424 A1 | 4/2002 | Lee | |
| 2002/0102988 A1 | 8/2002 | Myllymaki | |
| 2002/0115445 A1 | 8/2002 | Myllymaki | |
| 2002/0118118 A1 | 8/2002 | Myllymaki et al. | |
| 2002/0154134 A1 | 10/2002 | Matsui | |
| 2002/0168958 A1 | 11/2002 | Ford et al. | |
| 2002/0174335 A1 | 11/2002 | Zhang et al. | |
| 2002/0176366 A1 | 11/2002 | Ayyagari et al. | |
| 2002/0188723 A1 | 12/2002 | Choi | |
| 2002/0194384 A1 | 12/2002 | Habetha | 709/249 |
| 2003/0023746 A1 | 1/2003 | Loguinov | |
| 2003/0098811 A1 | 5/2003 | Nikolai | |
| 2003/0117985 A1 | 6/2003 | Fujii et al. | |
| 2003/0130987 A1 | 7/2003 | Edlund et al. | |
| 2003/0133426 A1 | 7/2003 | Schein et al. | 370/337 |
| 2003/0134648 A1 | 7/2003 | Reed et al. | 455/456 |
| 2003/0135486 A1 | 7/2003 | Edlund et al. | |
| 2003/0135762 A1 | 7/2003 | Macaulay | |
| 2003/0188006 A1 | 10/2003 | Bard | |
| 2003/0198208 A1 | 10/2003 | Koos | |
| 2003/0224787 A1 | 12/2003 | Gandolfo | 455/434 |
| 2004/0022214 A1 | 2/2004 | Goren et al. | |
| 2004/0029559 A1 | 2/2004 | McNew | |
| 2004/0066757 A1 | 4/2004 | Molteni et al. | |
| 2004/0072577 A1 | 4/2004 | Myllymaki et al. | |
| 2004/0078598 A1 | 4/2004 | Barber et al. | 713/201 |
| 2004/0111397 A1 | 6/2004 | Chen et al. | |
| 2004/0111607 A1 | 6/2004 | Yellepeddy | |
| 2004/0121827 A1 | 6/2004 | Murakami et al. | 455/575.7 |
| 2004/0151377 A1 | 8/2004 | Boose et al. | |
| 2004/0166878 A1 | 8/2004 | Erskine et al. | |
| 2004/0176108 A1 | 9/2004 | Misikangas | |
| 2004/0186847 A1 | 9/2004 | Rappaport et al. | |
| 2004/0198373 A1 | 10/2004 | Ford et al. | |
| 2004/0198392 A1 | 10/2004 | Harvey | |
| 2004/0203910 A1 | 10/2004 | Hind et al. | |
| 2004/0236547 A1 | 11/2004 | Rappaport et al. | |
| 2004/0259554 A1 | 12/2004 | Rappaport et al. | |
| 2004/0259555 A1 | 12/2004 | Rappaport et al. | |
| 2005/0068925 A1 | 3/2005 | Palm | |
| 2005/0113090 A1 | 5/2005 | Sharony | |
| 2005/0128139 A1 | 6/2005 | Misikangas et al. | |
| 2005/0131635 A1 | 6/2005 | Myllymaki et al. | |
| 2005/0136944 A1 | 6/2005 | Misikangas et al. | |
| 2005/0185615 A1 | 8/2005 | Zegelin | |
| 2005/0261004 A1 | 11/2005 | Dietrich et al. | |
| 2006/0071854 A1 | 4/2006 | Wilcox | |
| 2006/0099952 A1 | 5/2006 | Prehofer | 455/440 |

FOREIGN PATENT DOCUMENTS

| | | |
|---|---|---|
| EP | 0967816 | 12/1999 |
| EP | 1018457 | 7/2000 |
| EP | 1296531 | 3/2003 |
| EP | 1301055 | 4/2003 |
| JP | 02044929 | 2/1990 |
| WO | WO 97/33386 | 9/1997 |
| WO | WO 98/41048 | 9/1998 |
| WO | WO 99/08909 | 2/1999 |

| | | |
|---|---|---|
| WO | WO 00/18148 A1 | 3/2000 |
| WO | WO 02/43425 | 5/2002 |
| WO | WO 02/054813 | 7/2002 |
| WO | WO 03/023443 | 3/2003 |

OTHER PUBLICATIONS

"Ekahau Logical Areas-location enabling the Wi-Fi network." Apr. 4, 2003 Ekahau, Inc., Saratoga, CA. Company's URL: www.ekahau.com.

"Ekahau Positioning Engine 2.0: Product Overview." Apr. 4, 2003. Ekahau, Inc., Saratoga, CA. URL: http://www.ekahau.com/products/positioningengine.

Ekahau Positioning Engine 2.0: Data Sheet.: Apr. 4, 2003. Ekahau, Inc., Saratoga, CA. URL: http://www.ekahau.com/pdf/EPE—2.0_datasheet.PDF.

"Indoor Positioning in 802.1 lb Networks." Apr. 4, 2003. Ekahau, Inc. Saratoga, CA. URL: http://www.ekahau.com/products/positioningengine/features.html.

"Infielder." Apr. 22, 2003. Wireless Valley, Austin, TX. URL:http://www.wirelessvaley.com/Products/Infielder/InFielder.asp.

"LANFielder." Apr. 22, 2003. Wireless Valley, Austin, TX. URL:http://www.wirelessvaley.com/Products/LANFielder/LANFielder.asp.

"Optimatic." Apr. 22, 2003. Wireless Valley, Austin, TX URL:http://www.wirelessvaley.com/Products/Optimatic/Optimatic.asp.

"Predictor." Apr. 22, 2003. Wireless Valley, Austin, TX URL:http://www.wirelessvaley.com/Products/Predictor/Predictor.asp.

"LANFielder Product Literature." Feb. 10, 2004. Wireless Valley, Austin, TX. URL:http://www.wirelessvaley.com/Assets/brochures/LanFielder.pdf.

Conley, C. "Securing WLANS with Location-Enabled Networks." *Wireless Security Perspectives*, vol. 5, No. 3, Mar. 2003. Organizatio's URL: www.cnp-wireless.com/wsp.html.

"Company Information." Apr. 6, 2004. Corsair Communications: A LightBridge Company, Burlington, MA. Company' URL: www.lightbridge.com.

"Corporate Fact Sheet." Aruba Wireless Networks, San Jose, CA. Feb. 10, 2004. URL: http://www.arubanetworks.com/pdf/corporate_fact_sheet.pdf.

"Airwave Rogue Access Point Detection." 2002. Airwave Wireless, Inc. San Mateo, CA. URL: http://airwave.com/features. html.

Geier, J. "Identifying Rogue Access Points." Jan. 6, 2003. Wi-Fi Planet Tutorials URL: http: www.wi-fiplanet.com/tutorials/article/php/1564431.

Brewin, B. "IBM Develops Tool to Detect Rogue Wireless LAN Access Points" Jun. 17, 2002. Computerworkd, Framingham, MA URL: http://www.computerworld.com/mobiletopics/mobile.story/0,10801,72065,00.html.

Bulusu, N., Heidemann, J., Estrin, D. "GPS-less Low Cost Outdoor Localization for Very Small Devices." *IEEE Personal Communications*, Oct. 2000. URL:http//lecs.cs.ucla.edu/~bulusu/papers/Bulusu00a.pdf.

"AeroScout WLAN Location System." Downloaded on Nov. 10, 2003 from http://www.bluesoft-inc.com/wlan.asp Bluesoft, Inc., San Mateo, CA.

"Cognio Announces Breakthrough Location Technology for WLAN Depolyments." Downloaded on Nov. 10, 2003 from http://www.cognio.com/press_detail.asp?itemID=70 Cognio, Inc., Waltham, MA.

"WhereNet Main Page." Downloaded Nov. 10, 2003 from http://www.wherenet.com/ WherreNet, Santa Clara, CA.

Small, J., Smailagic, A., and Siewiorek, D.P. "Determining User Location for Context Aware Computing Through the Use of a Wireless LAN Infrastructure." Institute for Complex Engineered Systems. Carnegie-Mellon University, Pittsburgh, PA 2000. Available at http://www-2.cs.cmu.edu/~aura/docdir/small00.pdf.

Kishan, A., Michael, M., Rihan, S., and R. Biswas. "Halibut: An Infrastructure for Wireless LAN Location-Based Services." Technical paper for Course CS44n, Computer Science Department, Stanford University, Stanford, CA, Jun. 2001. Previously available at http://fern2.stanford.edu/cs444n/paper.pdf.

Bahl, P. and Padmanabhan, V.N. "RADAR: An In-building RF-based User Location and Tracking System." IEEE Infocom 2000, vol. 2, Mar. 2000, pp. 775-784.

"Positioning in Wireless Networks Reference" Dowloaded on Jul. 28, 2005 from http://binary.engin.brown,edu/.BINARY Group, Division of Engineering, Brown University, Providence, RI Available online at http:// binary.engin.brown,edu/publication/Positioning_Ref. pdf.

Chirumamilla, Mohan K. and Ramamurthy, Byrav. "Agent Based Intrusion Detection and Response System for Wireless LANs" IEEE Int'l conference on Communications, 2003, vol. 1. pp. 492-496.

"IBM Researchers Demonstrate Industry's First Auditing Tool for Wireless Network Security" Jul. 12, 2001, Hawthorne, N.Y. IBM Research News. 'Online. URL: http://domino.research.ibm.com/comm/pr.nsf/pages/news.20010712_wireless.html.

"IBM Researchers Demonstrate Industry's First Self-Diagnostic Wireless Security Monitoring Tool" Jun. 21, 2002, Hawthorne, N.Y. IBM News. 'Online. URL: http://domino.research.ibm.com/comm/pr.nsf/pages/news.20020617_dwsa.html.

"Assessing Wireless Security with AiroPeek and AiroPeek NX" A WildPackets Academy Tutorial from www.wildpackets.com, WildPackets Inc., Walnut Creek, CA Jan. 16, 2003 URL: http://www.wildpackets.com/elements/whitepapers/AiroPeek_Security.pdf.

"AiroPeek and Wireless Security: Identifying and Locating Rogue Access Points". A WildPackets Academy Tutorial from www.wildpackets.com, WildPackets Inc., Walnut Creek, CA Jan. 16, 2003 URL: http://www.wildpackets.com/elements/whitepapers/RogueAccessPoints.pdf.

Craiger, J.P. "802.11, 802.1x, and Wireless Security" Jun. 23, 2002. From the SANS' Information Security Reading Room on www.sans.org, The SANS Institute, Bethesda, MD URL: http://www.sans.org/rr/papers/68/171.pdf.

Baily, S. "Is IEEE 802.1X Ready for General Deployment?" Apr. 7, 2002. From the SANS' Information Security Reading Room on www.sans.org, The SANS Institute, Bethesda, MD URL: http://www.sans.org/rr/papers/9/709.pdf.

"Location Determination Papers", List of publications maintained by Moustafa A. Youssef, Department of Computer Science, University of Maryland, College Park, MD 20742. Available online and downloaded Feb. 9, 2006 at http://www.cs.umd.edu/~moustafa/location_papers.htm.

"Positioning in Wireless Networks Reference" BINARY Group, Division of Engineering, Brown University, Providence, RI 02912, Available online and downloaded Feb. 9, 2006 as binary,engin.brown.edu/publication/Positioning_Ref.pdf.

L.M. Ni, Y. Liu, Y.C. Lau an A/P/ Patil. "LANDMARC: Indoor Location Sensing Using Active RFID." Proceedings of the First IEEE Int'n. conference of Pervasive Computing and Communications 2003 (PerCom '03).

G. Wofle, R. Wahl, P.Wertz, P. Wildbolz and F. Landstorfer. "Dominant Path Prediction Model for Indoor Scenarios." German Microwave Conference (GeMIC) 2005, Ulm (Germany), Apr. 2005 Paper.

P. Wertz, G. Wolfle, R. Hoppe, D. Zimmermann and F.M. Landstorfer. "Enhanced Localization Technique within Urban and Indoor Environments based on Accurate and Fast propagation Models." European Wireless, 2002, Florence, Italy.

Steven Fortune, "Algorithms for prediction of indoor radio propagation", sjf@research.att.com, Jan. 7, 1998, Bell Laboratories, Murray Hill, New Jersey 07974.

U.S. Appl. No. 10/155,938, filed May 24, 2002 by Patrice R. Calhoun, Robert B. O'Hara, Jr. and Robert J. Friday and entitled "Method and System for Hierarchical Processing of Protocol Information in a Wireless LAN".

A. Rajkumar, B.F. Naylor, F. Feisullin and L. Rogers, "Predicting RF Coverage in Large Environments Using Ray-Beam Tracing and Partitioning Tree Represented Geometry", submitted to the ACM Journal of Wireless Networks after revision on Oct. 12, 1995, AT&T Bell Laboratories, Murray Hill, NJ 07974.

Reinaldo A. Valenzuela, Steven Fortune and Jonathan Ling, "Indoor Propagation Prediction Accuracy and Speed Versus Number of Reflections in Image-Based 3-D Ray-Tracing" 1998, Bell Laboratories, Lucent Technologies, Holmdel, NJ 07733.

Bahl, P., Padmanabhan, V. and Balachandran, A. A Software System for Locating Mobile Users: Design, Evaluation and Lessons. Microsoft Research Technical Report MSR-TR-2000-12 [online], Apr. 2000 [retrieved on Jan. 26, 2006] Retrieved from the Internet: < URL: http://research.microsoft.com/~padmanab/papers/radar.pdf.

Office Action from U.S. Appl. No. 10/802,366, filed Mar. 16, 2004, entitled "Location of Wireless Nodes Using Signal Strength Weighting Metric".

International Standard, ISO/IEC 8802-11 ANSI/IEEE std. 802.11, 1999 Edition, Part II: Wireless LAN medium Access Control (MAC) and Physical Layer (PHY) specifications, pp. 122-137.

"tcp-masq" Internet citation http://speed.cis.nctu.edu.tw/bandwidth/opensource/ DataSheet Cisco Aironet 1200 Series Access Point, pp. 1-13, posted Mar. 11, 2002.

Office Action from U.S. Appl. No. 10/794,842, filed Mar. 5, 2004, entitled "Selective Termination of Wireless Connections to Refresh Signal Information in Wireless Node Location Infrastructure".

Office Action from U.S. Appl. No. 10/788,645, filed Feb. 27, 2004, entitled "Selective Termination of Wireless Connections to Refresh Signal Information in Wireless Node Location Infrastructure".

Second Office Action from U.S. Appl. No. 10/802,366, filed Mar. 16, 2004, entitled "Location of Wireless Nodes Using Signal Strength Weighting Metric".

PCT Notification of Transmittal of the International Search Report and the Written Opinion of the International Searching authority or the Declaration (PCT Rule 44.1), dated Jan. 11, 2006 International Application No. PCT/US05/06608.

Office Action from U.S. Appl. No. 10/848,276, filed May 18, 2004, entitled "Wireless Node Location Mechanism Featuring Definition of Search Region to Optimize Location Computation".

*European Patent Office Communication*, Netherlands Communication pursuant to Article 94(3) EPC re: application deficiencies, Application No. 05 738 769.8-1248; Ref. P28883EP-PCT (8 pgs), Aug. 18, 2011.

Brelaz, "New Methods to Color the Vertices of a Graph," *Communicatios of the ACM*, vol. 22, No. 4, pp. 251-256, Apr. 1979 (online).

Randall-Brown, "Chromatic Scheduling and the Chromatic Number Problem," *Management Science*, vol. 19, No. 4, pp. 456-463, Dec. 1972.

* cited by examiner

WIRELESS NODE LOCATION MECHANISM FEATURING DEFINITION OF SEARCH REGION TO OPTIMIZE LOCATION COMPUTATION

CROSS-REFERENCE TO RELATED PATENT APPLICATIONS

This application is a continuation of U.S. application Ser. No. 10/848,276 filed May 18, 2004 and entitled "Wireless Node Location Mechanism Featuring Definition of Search Region to Optimize Location".

This application makes reference to the following commonly owned U.S. patent applications and/or patents, which are incorporated herein by reference in their entirety for all purposes:

U.S. patent application Ser. No. 10/155,938 in the name of Patrice R. Calhoun, Robert B. O'Hara, Jr. and Robert J. Friday, entitled "Method and System for Hierarchical Processing of Protocol Information in a Wireless LAN;"

U.S. application Ser. No. 10/183,704 in the name of Robert J. Friday, Patrice R. Calhoun, Robert B. O'Hara, Jr., Alexander H. Hills and Paul F. Dietrich, and entitled "Method and System for Dynamically Assigning Channels Across Multiple Radios in a Wireless LAN;"

U.S. patent application Ser. No. 10/407,357 in the name of Patrice R. Calhoun, Robert B. O'Hara, Jr. and Robert J. Friday, entitled "Method and System for Hierarchical Processing of Protocol Information in a Wireless LAN;"

U.S. patent application Ser. No. 10/407,370 in the name of Patrice R. Calhoun, Robert B. O'Hara, Jr. and David A. Frascone, entitled "Wireless Network System Including Integrated Rogue Access Point Detection;"

U.S. application Ser. No. 10/447,735 in the name of Robert B. O'Hara, Jr., Robert J. Friday, Patrice R. Calhoun, and Paul F. Dietrich and entitled "Wireless Network Infrastructure including Wireless Discovery and Communication Mechanism;"

U.S. patent application Ser. No. 10/783,186 in the name of Robert J. Friday and Paul F. Dietrich, entitled "Wireless Node Location Mechanism Using Antenna Pattern Diversity to Enhance Accuracy of Location Estimates;"

U.S. patent application Ser. No. 10/788,645 in the name of Robert J. Friday and Alexander H. Hills, entitled "Selective Termination of Wireless Connections to Refresh Signal Information in Wireless Node Location Infrastructure;" and U.S. patent application Ser. No. 10/802,366 in the name of Paul F. Dietrich, Gregg Davi and Robert J. Friday, entitled "Location of Wireless Nodes Using Signal Strength Weighting Metric."

FIELD OF THE INVENTION

The present invention relates to estimating the location of wireless nodes in a radio frequency (RF) environment and, more particularly, to methods, apparatuses and systems directed to a wireless node location mechanism that defines a search region to facilitate computations associated with estimating the location of a wireless node.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

The rapid proliferation of lightweight, portable computing devices and high-speed WLANs has enabled users to remain connected to various network resources, while roaming throughout a building or other physical location. The mobility afforded by WLANs has generated a lot of interest in applications and services that are a function of a mobile user's physical location. Examples of such applications include: printing a document on the nearest printer, locating a mobile user, displaying a map of the immediate surroundings, and guiding a user inside a building. The required or desired granularity of location information varies from one application to another. Indeed, the accuracy required by an application that selects the nearest network printer, or locates a rogue access point, often requires the ability to determine in what room a mobile station is located. Accordingly, much effort has been dedicated to improving the accuracy of wireless node location mechanisms.

The use of radio signals to estimate the location of a wireless device or node is known. For example, a Global Positioning System (GPS) receiver obtains location information by triangulating its position relative to four satellites that transmit radio signals. The GPS receiver estimates the distance between each satellite based on the time it takes for the radio signals to travel from the satellite to the receiver (i.e., Time Difference Of Arrival (TDOA) calculations). Signal propagation time is assessed by determining the time shift required to synchronize the pseudo-random signal transmitted by the satellite and the signal received at the GPS receiver. Although triangulation only requires distance measurements from three points, an additional distance measurement from a fourth satellite is used for error correction.

The distance between a wireless transmitter and a receiver can also be estimated based on the strength of the received signal, or more accurately the observed attenuation of the radio signal. Signal attenuation refers to the weakening of a signal over its path of travel due to various factors like terrain, obstructions and environmental conditions. Generally speaking, the magnitude or power of a radio signal weakens as it travels from its source. The attenuation undergone by an electromagnetic wave in transit between a transmitter and a receiver is referred to as path loss. Path loss may be due to many effects such as free-space loss, refraction, reflection, and absorption.

In business enterprise environments, most location-tracking systems are based on RF triangulation or RF fingerprinting techniques. RF triangulation calculates a mobile station's location based upon the detected signal strength of nearby access points (APs). It assumes that signal strength is a factor of proximity, which is true in certain RF environments. However, the multipath phenomenon encountered in indoor RF environments, which include walls, windows, and other RF obstructions, does present certain difficulties for location systems using triangulation, since reflection and absorption of RF signals affects the correlation between signal strength and proximity. RF fingerprinting compares a mobile station's, or access point's, view of the RF environment (i.e., the strength of signals transmitted by the infrastructure access points, or the mobile station) with a database that contains an RF physical model of the coverage area. This database is typically populated by either an extensive site survey, a RF prediction model of the coverage area, and other statistical techniques. For example, Bahl et al., "A Software System for Locating Mobile Users: Design, Evaluation, and Lessons," http://research.microsoft.com/~bahl/Papers/Pdf/radar.pdf, describes an RF location system (the RADAR system) in a WLAN environment, that allows a mobile station to track its own location relative to access points in a WLAN environment.

The RADAR system relies on a so-called Radio Map, which is a database of locations in a building and the signal strength of the beacon packets emanating from the access points as observed, or estimated, at those locations. For example, an entry in the Radio Map may look like (x, y, z, $ss_i$ (i=1 ... n)), where (x, y, z) are the physical coordinates of the location where the signal is recorded, and $ss_i$ is the signal strength of the beacon signal emanating from the ith access point. According to Bahl et al., Radio Maps may be empirically created based on heuristic evaluations of the signals transmitted by the infrastructure radios at various locations, or mathematically created using a mathematical model of indoor RF signal propagation. To locate the position of the mobile user in real-time, the mobile station measures the signal strength of each of access points within range. It then searches all locations in the Radio Map database against the detected signal strengths to find the location with the best match. Bahl et al. also describe averaging the detected signal strength samples, and using a tracking history-based algorithm, to improve the accuracy of the location estimate.

Computing the location in the Radio Map of the RADAR system which best fits the signal strength observed by the mobile station can be quite computationally intensive, especially as the boundaries of the RF environment and/or the granularity of the location coordinates in the Radio Map increase. The client application in the RADAR system searches the entire Radio Map for the best fitting location coordinates. While this circumstance does not represent a substantial limitation for the RADAR system, which involved a limited number of access points and location bins, this un-optimized search algorithm does not scale to large wireless network deployments, which may include hundreds to thousands of access points and hundreds of location bins in the coverage maps for each access point. In other words, the number of computations required to check each possible location as the best match grows with the size, and number of access points, within the RF environment. Indeed, in large wireless network deployments, as discussed more fully below, the location of a wireless node could involve checking millions to tens of millions of possible locations to find the best matching location. Moreover, the size of the database required to support wireless node location, according to the RADAR system, can become quite large. Accordingly, this un-optimized search algorithm can place a significant burden on the processing resources associated with a wireless node location system, especially infrastructure-based systems that perform other functions, such as providing wireless network access to the mobile stations.

In light of the foregoing, a need in the art exists for methods, apparatuses and systems that optimize the search for best fitting location coordinates in wireless node location mechanisms. Embodiments of the present invention substantially fulfill this need.

SUMMARY OF THE INVENTION

The present invention provides methods, apparatuses and systems directed to a wireless node location mechanism that defines a search region to optimize the computations associated with estimating the location of a given wireless node. According to an implementation of the present invention, a coverage map associated with each radio receiver that records signal strength data is defined out to a threshold signal strength level. Before computing the estimated location of a given wireless nodes, a search region is defined based on the intersection of the coverage maps associated with each radio receiver whose signal strength measurements are used to estimate the location the wireless node. Some implementations of the present invention use information provided by the fact that certain radio receivers did not detect the wireless node to further optimize the location estimate. By defining a search region, which is a generally small area relative to the space encompassed by the entire RF environment, the present invention provides several advantages, such as reducing the processing time and/or power to compute estimated locations for wireless nodes. In one implementation, the present invention can be used to reduce the computation associated with finding the best matching location to a fixed cost regardless of the size of the wireless network environment and/or the number of radio transceivers. As discussed in more detail below, the wireless node location mechanism can be incorporated into wireless network environments, such as 802.11 networks, to estimate the location of mobile stations, rogue access points and other wireless nodes.

DESCRIPTION OF PREFERRED EMBODIMENT(S)

A. Wireless Node Location and Signal Strength Weighting Metric

Figure 1:
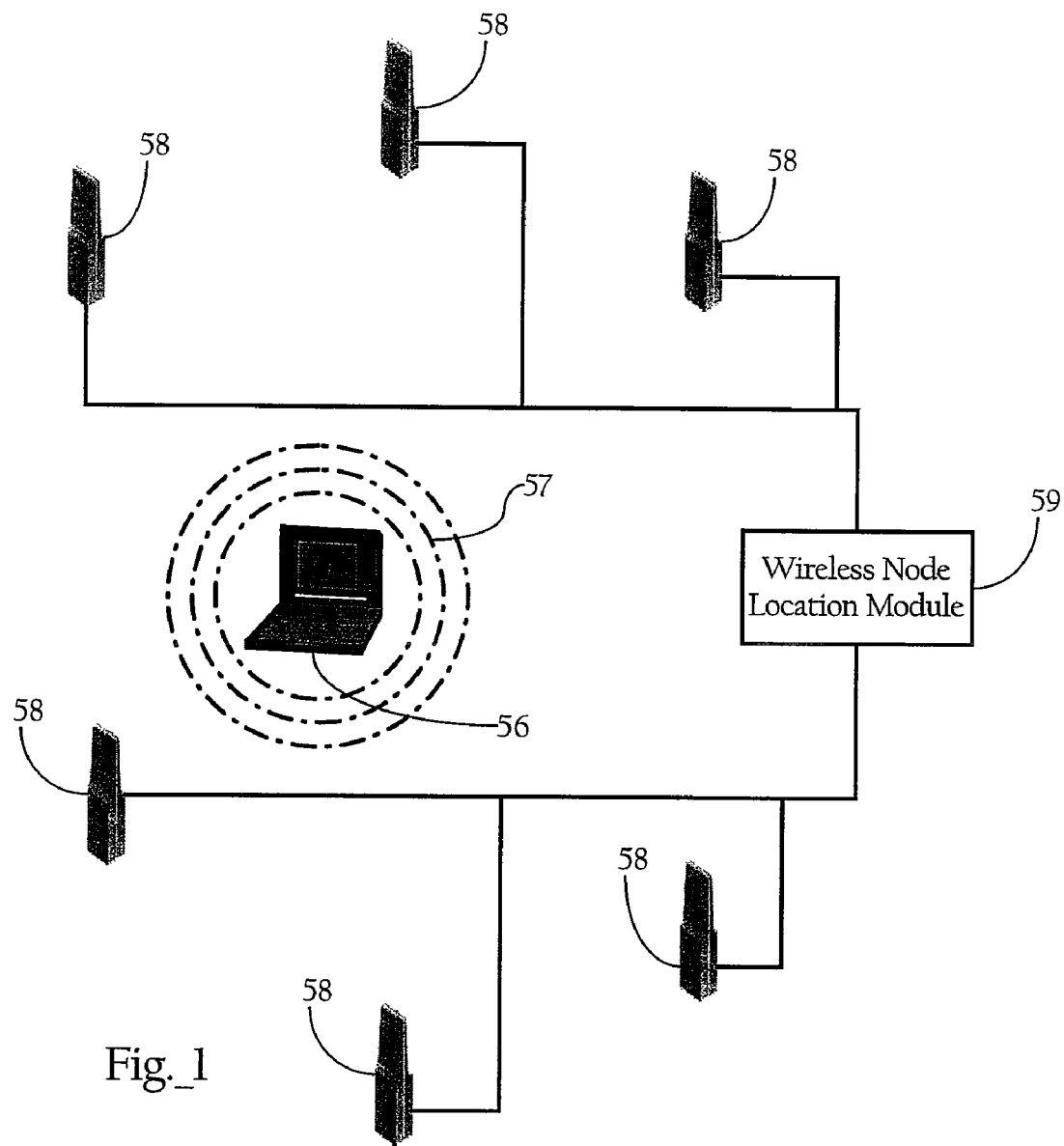
FIG. 1 is a schematic diagram including a wireless node location mechanism according to an implementation of the present invention.

FIG. 1 illustrates the basic operating components of a wireless node location mechanism according to an implementation of the present invention. As FIG. 1 shows, the wireless node location mechanism includes a wireless node location module 59 and a plurality of infrastructure radio transceivers 58 disposed throughout a physical space. One skilled in the art will recognize that the system depicted in FIG. 1 represents an example of the basic components of the invention and is mostly for didactic purposes. Implementations of the present invention can involve hundreds to thousands of infrastructure radio transceivers 58 deployed over large geographic areas. As discussed more fully below, the functionality generally denoted by infrastructure radio transceivers 58 and wireless node location module 59 can be integrated into a variety of systems, such as wireless systems dedicated for location of wireless nodes, or WLAN or other wireless network systems.

Infrastructure radio transceivers 58 generally comprise at least one antenna, a radio transmit/receive unit, and control logic (e.g., a 802.11 control unit) to control the transmission and reception of radio signals according to a wireless communications protocol. Infrastructure radio transceivers 58, in one implementation, are disposed in known and/or fixed locations throughout a physical space, such as a room, a collection of rooms, a floor of a building, an entire building, or an arbitrarily-defined region, including outside environments, over which infrastructure radio transceivers 58 provide radio-frequency coverage.

A.1. Infrastructure Radio Transceiver

Infrastructure radio transceivers 58 are operative to detect the strength of received radio-frequency signals, such as the signals 57 transmitted by wireless node 56 and by other radio transceivers, and provide the detected signal strength data for corresponding wireless nodes to wireless node location module 59. In one implementation, infrastructure radio transceivers 58 are also operative to transmit and receive wireless or radio-frequency signals according to a wireless communications protocol, such as the IEEE 802.11 WLAN protocol. Infrastructure radio transceivers 58, in one implementation, can operate on a selected channel from a plurality of channels in a given band. In another implementation, infrastructure radio transceivers 58 can also operate in more than one band. For example, infrastructure radio receivers 58 may be configured to operate in either the 802.11a-5 GHz band, and/or the 802.11b/g-2.4 GHz band. In one implementation, infrastructure radio transceivers 58 can be configured to collect the signal strength information associated with wireless nodes and transmit the collected data in response to SNMP or other requests by wireless node location module 59. In other implementations, the infrastructure radio transceivers 58 can transmit signal strength information on a regular or periodic basis. As discussed below, other methods for collecting signal strength data may also be employed.

Identification of wireless nodes depends on the wireless communications protocol in use. For 802.11 WLAN environments, for example, wireless nodes can be identified based on MAC address. Furthermore, wireless nodes can be authorized mobile stations, such as remote client elements 16, 18 (see FIG. 3), rogue systems (e.g., rogue access points and/or rogue mobile stations), as well as authorized access points for which no location information is known. In other implementations, wireless nodes can be identified based on a unique property of the RF signal, such as a given frequency channel, or a unique signal pattern, and the like. For example, the wireless node location functionality may be employed to locate a detected source of interference, such as a non-802.11 compliant device.

In one implementation, infrastructure radio transceivers 58 are also operable to communicate with one or more mobile stations, such as wireless node 56, according to a wireless communication protocol. For example, radio transceiver 58, in one implementation, is an access point or other WLAN component. In one implementation, radio transceiver 58 is operably connected to a Local Area Network (LAN), Wide Area Network (WAN) or other wireline network to bridge traffic between mobile stations and the wireline network. As discussed more fully below, radio transceiver 58 may also be an access element or light weight access point in a wireless network featuring hierarchical processing of protocol information. In one implementation, the radio transceiver 58 implements the 802.11 protocols (where 802.11, as used herein, generically refers to the IEEE 802.11 standard for wireless LANs and all its amendments). Of course, the present invention can be used in connection with any suitable radio-frequency-based wireless network or communications protocol.

In one implementation, infrastructure radio transceivers 58 make use of the signal strength detection functionality residing on a wireless network interface adapter to detect signal strength on a frame-by-frame basis. For example, the IEEE 802.11 standard defines a mechanism by which RF energy is measured by the circuitry (e.g., chip set) on a wireless network interface controller. The IEEE 802.11 protocol specifies an optional parameter, the receive signal strength indicator (RSSI). This parameter is a measure by the PHY layer of the energy observed at the antenna used to receive the current packet or frame. RSSI is measured between the beginning of the start frame delimiter (SFD) and the end of the PLCP header error check (HEC). This numeric value is an integer with an allowable range of 0-255 (a 1-byte value). Typically, 802.11 chip set vendors have chosen not to actually measure 256 different signal levels. Accordingly, each vendor's 802.11-compliant adapter has a specific maximum RSSI value ("RSSI_Max"). Therefore, the RF energy level reported by a particular vendor's wireless network adapter will range between 0 and RSSI_Max. Resolving a given RSSI value reported by a given vendor's chip set to an actual power value (dBm) can be accomplished by reference to a conversion table. In addition, some wireless networking chip sets actually report received signal strength in dBm units, rather than or in addition to RSSI. Other attributes of the signal can also be used in combination with received signal strength or as an alternative. For example, the detected Signal-to-Noise Ratio (SNR) during packet reception can be used in determining overlay signal transmit power. Again, many chip sets include functionality and corresponding APIs to allow for a determination of SNRs associated with packets received from other transceivers 58 and/or wireless node 56. The resulting signal strength information, in one implementation, can be associated with a time stamp corresponding to the receipt of the frame. As discussed herein, this signal strength information can be collected at each infrastructure radio transceiver 58 and/or the wireless node location module 59 in suitable data structures.

A.2. Wireless Node Location Module

Wireless node location module 59, in one implementation, collects signal strength data received from infrastructure radio transceivers 58 and maintains the signal strength data in association with a wireless node identifier, and an identifier for the infrastructure radio transceiver 58 which provided the signal strength data. Wireless node location module 59, in one implementation, is also configured to distinguish between signals received from infrastructure radio transceivers 58 and signals received from other wireless nodes based on the wireless node identifier. In one implementation, wireless node location module 59 maintains a variety of data structures for storing signal strength information. For example, one data structure is used to store the signal strength of signals transmitted between infrastructure radio transceivers 58. In one implementation, wireless node location module 59 stores this signal strength data in a N×N IRT matrix, where N is the number of infrastructure radio transceivers 58. The column entries can correspond to the transmitting transceiver, while the row entries correspond to the receiving transceiver, or vice versa. Various entries in this matrix may be null values as all infrastructure radio transceivers may not, and in most deployments probably will not, be able to detect one another. Wireless node location module 59, in one implementation, maintains signal strength data for all other wireless nodes in tables or other suitable data structures. In one implementation, wireless node location module 59 maintains, for each radio transceiver 58, a separate table including at least two fields: 1) a wireless node identifier; and 2) the detected signal strength. Additional fields may also include a time stamp indicating the time the infrastructure radio transceiver 58 received the signal, as well as an identifier for the antenna selected to transducer the signal. U.S. patent application Ser. No. 10/783,186 discloses the selective use of directional antennas in wireless node location systems. In one implementation, when the memory space allocated to the wireless node tables is depleted, the least recently used/updated entry as indicated by the time stamps is overwritten. In one implementation, wireless node location module 59 filters the signal strength data received from the infrastructure radio transceivers 58 against a list of wireless node identifiers in order to identify the appropriate data structure to update. One skilled in the art will recognize that a variety of data structures beyond matrixes and tables can be used.

As discussed above, signal strengths are detected, in one implementation, on a frame-by-frame basis. Accordingly, in one embodiment, the signal strength data maintained by wireless node location module 59 can be updated as the frames/packets are received. In one implementation, the latest signal strength value is used to essentially overwrite the old value. In other implementations, however, an average, moving average or weighted moving average can be used if successive wireless frames corresponding to a given wireless node are encountered within a threshold time interval (e.g., typically resulting from a data stream transmission). In such a situation, the time stamp can correspond to the time of the last packet or frame. In other implementations, the multiple signal strength samples for each infrastructure radio transceiver 58 can be collected and used in other statistically-based location schemes. In addition, while radio transceivers 58 when operating as access points typically operate on different channels, mobile stations at various times (e.g., transmitting probe requests to find access points) transmit wireless frames on all available operating channels. This helps to ensure that a plurality of infrastructure radio transceivers 58 detect the mobile station. In some implementations, one or more infrastructure radio transceivers 58 that are adjacent to a radio transceiver 58 that detected a given wireless node may be directed to switch to a given operating channel to listen for signals transmitted by the mobile station. Still further, as discussed below, the infrastructure radio transceivers 58 may be commanded to specifically transmit frames on a given channel for the purpose of updating the signal strength data maintained by wireless node location module 59. In yet another embodiment, the infrastructure radio transceiver 58 or other access point with which a given mobile station is associated may be commanded to disassociate the mobile station. This causes the mobile station to transmit probe requests on all available operating channels, refreshing the signal strength data collected by neighboring infrastructure radio transceivers. U.S. patent application Ser. No. 10/788,645 discloses the selective termination of wireless clients to refresh signal strength information in RF location systems.

A.2.a. IRT Coverage Maps

Wireless node location module 59 also maintains a RF physical model of the coverage area associated with the RF environment. As discussed in more detail below, the RF physical model returns an estimated physical location of a wireless node, given the strength of signals detected by the infrastructure radio transceivers 58, as well as an indication of the infrastructure radio transceivers reporting the signal strengths. In one implementation, the RF physical model characterizes for each infrastructure radio transceiver 58 the expected received signal strength associated with a wireless transmitter at a given location. For example, in one implementation, the RF physical model comprises, for each antenna associated with a given infrastructure radio transceiver 58, a radio coverage map or matrix that indicates the expected signal strength detected at an infrastructure radio transceiver received from a wireless node, assuming a uniform transmit power, at a given location defined in x-, and y-coordinates. This database can be populated in a variety of ways. For example, the radio coverage maps can be populated with the results of an extensive site survey, according to which a wireless transmitter is placed at different locations in the physical space. During the site survey, the infrastructure radio transceivers 58 operate in a listening mode that cycles between the antennas and report the resulting signal strength of the signal transmitted by the wireless node used to conduct the site survey. In one implementation, the infrastructure radio transceivers 58 can be configured to transmit the signal strength data back to the wireless transmitter, which may be a laptop computer or other wireless device. The coverage maps are constructed by associating the signal strength and location data in the coverage maps corresponding to each infrastructure radio transceiver. The coverage maps may also be constructed by having a WLAN tester (or other wireless node) simply measure the signal strength of frames transmitted by the infrastructure radio transceivers 58 (e.g., beacon packets) at desired locations within the deployment region. If path loss symmetry is assumed, these values can be used to construct the coverage maps for each of the infrastructure radio transceivers. According to either method, the results of the site survey can be statistically processed to yield coverage maps for each antenna and infrastructure radio transceiver 58. To estimate the location of the wireless node, wireless node location module 59 determines the location coordinates, or range of location coordinates, that best fit the coverage maps associated with the infrastructure radio transceivers 58 selected to locate the wireless node based on the detected signal strength data, as discussed in more detail below.

In another implementation, the coverage maps of the RF physical model may be constructed using RF prediction to model the coverage area, employing mathematical techniques like ray-tracing, and the like. In one implementation, the RF prediction model can be computed for each coordinate location in a desired physical space, assuming a uniform wireless node transmit power. The estimated signal strength information for each infrastructure radio transceiver 58 can be used to populate the coverage maps discussed above. In an alternative embodiment, RF prediction models can be computed relative to each infrastructure radio transceiver antenna. If path loss symmetry and transmit power symmetry between the wireless nodes and the infrastructure radio transceivers 58 are assumed, the coverage maps for each infrastructure radio transceiver antenna can be populated by using the computed values at each of the coordinate locations in the coverage map. Of course, site survey data can also be used to adjust one or more parameters associated with the RF prediction model used to estimate expected signal strength at the various locations. As above, the boundaries of the coverage maps can be contoured based on the properties of the antennas connected to the infrastructure radio transceivers 58. In addition, the location coordinates in the coverage maps can be two-dimensional, x- and y-coordinates, defining location in a horizontal plane. The location coordinates can also be three-dimensional, x-, y- and z-coordinates. Other coordinate systems can be used, such as spherical coordinates or cylindrical coordinates. In addition, the values of the coordinates can be either global (i.e., longitude and latitude) or expressed relative to an arbitrarily-defined origin. In addition, the granularity of the coordinates in the coverage maps depends on the desired granularity of the wireless node location estimates.

In one implementation, a coverage map, for each infrastructure radio transceiver 58 (or for each antenna connected thereto), is maintained that includes the signal strengths in an N×M matrix, where N is the number of x-coordinates in the coverage map, and M is the number of y-coordinates in the coverage map. Each element or bin in the rectangular coverage map corresponds to a region of certain uniform size (such as a square region of 10 sq. ft., or 16 sq. ft, etc.). In one implementation, the coverage map for a given infrastructure radio transceiver 58 is stored in a database in the following format:

| | |
|---|---|
| IRTid | //IRT Identifier |
| Double lowerLeftCornerx Cov. Map | //x-coord. of Lower Left Corner of |
| Double LowerLeftCornery Map | //y-coord. of Lower Left Corner of Cov. |
| integer binCntx | //number of bins in x-direction |
| integer binCnty | //number of bins in y-direction |
| integer binsize | //size of bins |
| binary array RSSIVals | //array of signal strength values |

As the data elements in the format above indicate, the location of the lower left hand corner of the coverage map is defined by location coordinates relative to a physical space or region that encompasses all coverage maps for the infrastructure radio transceivers 58. The location coordinates of the other corners, as well as the contours, of each coverage map can be computed based on the coordinates of the lower-left hand corner, the number of bins in the x- and y-directions, and the size of the bins. The outer contours of the coverage map, or in other words, the number of bins in the x- and y-directions, is determined by reference to a threshold signal strength value, such as −95 dBm. The threshold signal strength value, in some implementations, can be a configurable parameter. In some implementations, the threshold signal strength value is set to the sensitivity of the infrastructure radio transceivers 58.

The coverage maps can be constructed in a variety of ways. For example, in one implementation, coverage maps are computed using a mathematical model, such as RF prediction, based on a default coverage map having a maximum size (e.g., 10,000 bins) defined by a default aspect ratio. The coverage map is then trimmed, starting with the left edge, by eliminating each leftmost column where all bins in that column include a signal strength below the threshold. The right edge of the coverage map, as well as the top and bottom edges, are trimmed in the same manner. The starting aspect ratio of the default coverage map can be configured to reflect the characteristics (e.g., antenna pattern) of the antennas of the infrastructure radio transceivers 58. For example, the default aspect ratio for omni-directional antennas can be 1:1. For directional antennas, the default aspect ratio will depend on the peak gain and bandwidth of the antennas. In addition, if directional antennas are used, the coverage maps should be oriented relative to the orientation of the peak gain of the antennas. In the data format described above, it is assumed that the peak gains of directional antennas are oriented in the x-direction or the y-direction. In other implementations, the data format described above, may also include a parameter defining the angular orientation of the coverage map relative to the overall RF environment. Of course, the coverage maps can be constructed in other ways. For example, the coverage maps can be constructed by computing the signal strength values starting with the center or location of the infrastructure radio transceiver and building out row-by-row, and/or column-by-column, until all bins in the last computed edge have signal strength values below the threshold value. The resulting coverage map can also be trimmed as well. For example, if the coverage map was built row-by-row, additional columns may be required, or the some of the resulting columns may need to be trimmed.

The data structures described above achieve a number of objects and advantages in computing the estimated location of a wireless node. For example, by storing each coverage map as a separate object, the location mechanism according to the present invention can be easily scaled to systems including large numbers of infrastructure radio transceivers 58. In addition, the use of rectangular coverage maps, according to certain implementations of the invention, facilitates fast searches of the database to identify the region where the infrastructure radio transceivers have overlapping coverage. For example, determining whether an infrastructure radio transceiver has coverage in a given rectangular search region is equivalent to finding out whether or not two rectangular coverage maps overlap. Computationally, this becomes a fairly quick problem to solve. In addition, defining the search region, as discussed more fully below, is based on finding the rectangular intersection of the coverage maps. Furthermore, the specification of the lower left hand corner, bin size and number of bins in the x- and y-directions for each coverage map facilitates these computations.

In one implementation, the wireless node location module 59 includes more than one RF physical model of the environment (in one implementation, each RF physical model is a set of coverage maps corresponding to the antennas of the infrastructure radio transceivers 58), and uses signals transmitted between the infrastructure radio transceivers 58 to dynamically select one of the RF physical models (a set of coverage maps) that best characterizes the current RF environment. As discussed above, the propagation of RF signals is effected by a variety of objects, including people, that move within an RF environment. In one implementation, the wireless node location functionality can compare the signal strength data in the N×N IRT signal strength matrix and the known locations of the infrastructure radio transceivers against the RF physical models to find the best fit. In one implementation, infrastructure radio transceivers 58 can be configured to transmit wireless frames at regular intervals on one to a plurality of operating channels within a given frequency band to allow for the other infrastructure radio transceivers 58 to detect the signals. U.S. application Ser. No. 10/447,735 discloses the transmission of frames for detection by neighboring WLAN transceivers. In another implementation, infrastructure radio transceivers 58 transmit frames, on demand, in response to commands issued by wireless node location module 59.

A.2.b. Estimating Wireless Node Location

Figure 2:
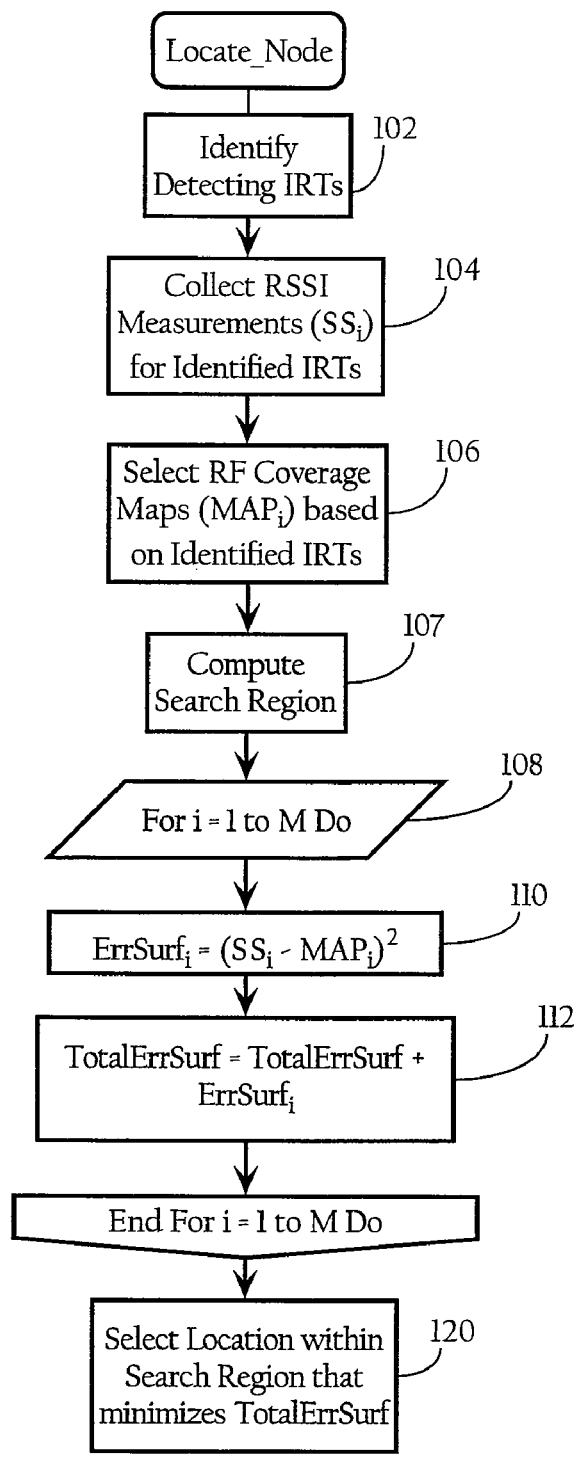
FIG. 2 is a flow chart diagram illustrating the overall process flow directed to the location of a wireless node according to an implementation of the present invention.

FIG. 2 illustrates a method, according to one implementation of the present invention, directed to estimating the location of a wireless node. The wireless node location functionality can be triggered on demand, for example, in response to a command issued by a network administrator using a control interface to locate a mobile station identified by a MAC address or other suitable identifier, such as an arbitrary name associated with a MAC address in a table or other data structure. Wireless node location module 59 may also be triggered automatically in response to the detection of a rogue access point. U.S. application Ser. No. 10/407,370, incorporated by reference above, discloses detection of rogue access points in a wireless network system. Wireless node location module 59 can also be configured to periodically determine the location of a given mobile station in order to track its movement over a period of time.

As FIG. 2 illustrates, wireless node location module 59, in one implementation, begins by selecting the infrastructure radio transceivers (IRTs) 58 whose signal measurements will be used in locating the desired wireless node. In one implementation, wireless node location module 59 scans the data structures discussed above to identify the infrastructure radio transceivers 58 that see or detect wireless frames transmitted by the desired wireless node (102). In implementations where signal strength data is regularly collected (as opposed to on demand), the time stamps in the data structures can be used to filter out infrastructure radio transceivers 58 that have not detected the desired wireless node within a threshold period of time. Additional or alternative filter criteria can include a threshold signal strength level. For example, in one implementation, wireless node location module 59 excludes any infrastructure radio transceiver 58 that detects the wireless node at a signal strength threshold of −80 dBm. This implementation allows the coverage maps to be computed out to −90 dBm, and further allows for 10 dBm in measurement error while still computing an appropriate search region. Of course, the threshold signal strength determination can be a configurable parameter. Furthermore, the entire threshold determination can be a configuration option which can be turned off altogether. In one implementation, wireless node location module 59 selects up to M infrastructure radio transceivers 58 that report the strongest signal strengths (where M is a configurable parameter). In one implementation, if an insufficient number of infrastructure radio transceivers 58 are identified, wireless node location module 59 can command the infrastructure radio transceivers 58 to actively scan for the desired wireless node and return signal strength information. Wireless node location module 59 collects the signal strength (e.g., RSSI) measurements corresponding to the selected infrastructure radio transceivers 58 (104), and identifies the RF coverage maps to be used in estimating the location of the wireless node based on selected infrastructure radio transceivers 58 (106).

Figure 5:
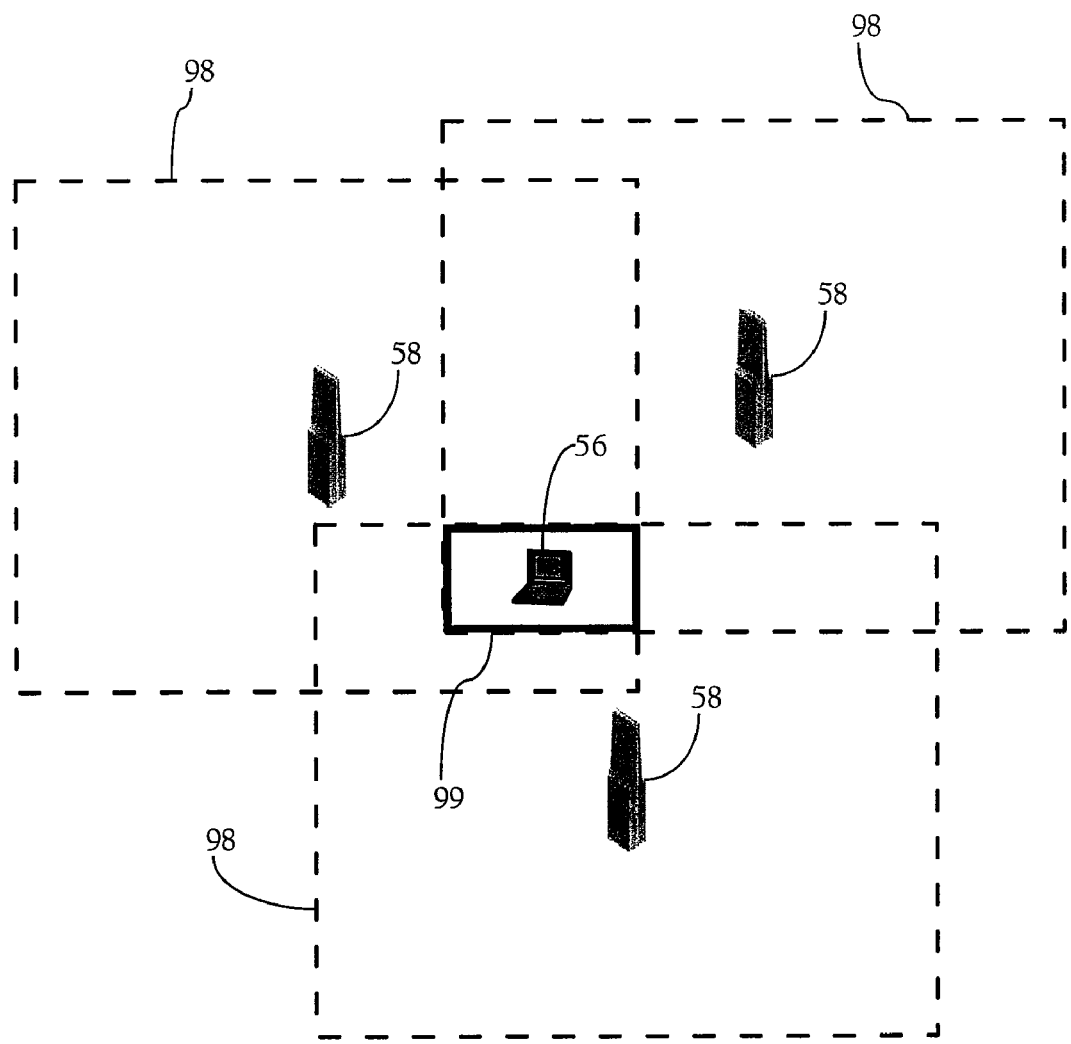
FIG. 5 is a schematic diagram illustrating the definition of a search region, according to an implementation of the present invention.

Wireless node location module 59 then computes the search region that defines the boundaries of the possible estimated location for the wireless node (107). In one implementation, wireless node location module 59 queries the database to obtain the regions defined by the coverage maps of the identified infrastructure radio transceivers 58 that detected the wireless node. In one embodiment, wireless node location module 59 computes each coverage map region, based on the location coordinates of the lower left corner of the coverage map, the number of bins in the x- and y-directions, and the size of the bins. Wireless node location module 59 then computes the intersection of all the coverage map regions to obtain the search region. In the implementation discussed above, the rectangular coverage map regions facilitate the computation of the search region, since the intersection of M rectangles is itself a rectangle. Accordingly, this approach reduces the processing time and/or power required to compute the search region. Furthermore, the rectangular coverage maps and search region, according to certain implementations, facilitates fast database interactions within the abilities of a standard relational databases. FIG. 5 graphically illustrates the computation of a search region 99 based on the intersection of coverage map regions 98 corresponding to three infrastructure radio transceivers 58. The search region defines the set of possible locations for the wireless node, since these locations are common to the coverage maps of the identified infrastructure radio transceivers 58. Confining the location estimate to the search region also ensures that there is a valid signal strength value for each infrastructure radio transceiver 58 for the entire computation.

As FIG. 2 shows, wireless node location module 59, for all identified infrastructure radio transceivers (108), computes, for each point in the coverage map within the search region, $MAP_i$, an error surface, $ErrSurf_i$, characterizing the difference between the signal strength, $SS_i$, detected by the infrastructure radio transceiver and the value in the corresponding coverage map (110). To neutralize positive and negative errors, wireless node location module 59, in one implementation, uses the square of the error for each point in the error surface. As FIG. 2 illustrates, wireless node location module 59 sums the individual error surfaces, $ErrSurf_i$, to create a total error surface, TotalErrSurf, for all points within the search region (112). To estimate the location of the desired wireless node, wireless node location module 59 selects the location within the search region that minimizes the total error surface, TotalErrSurf (120).

Or course, variations are possible. For example, the contribution of each error surface, $ErrSurf_i$, can be weighted by a weighing function whose value depends on the detected signal strength, $SS_i$, reported by the infrastructure radio transceiver 58. U.S. application Ser. No. 10/802,366 discloses the use of signal-based weighting functions in wireless node location systems. Moreover, as FIGS. 6 and 7 provide, wireless node location module 59 may augment the location estimate to include infrastructure radio transceivers 58 which did not detect the wireless node, as discussed more fully below.

Figure 6:
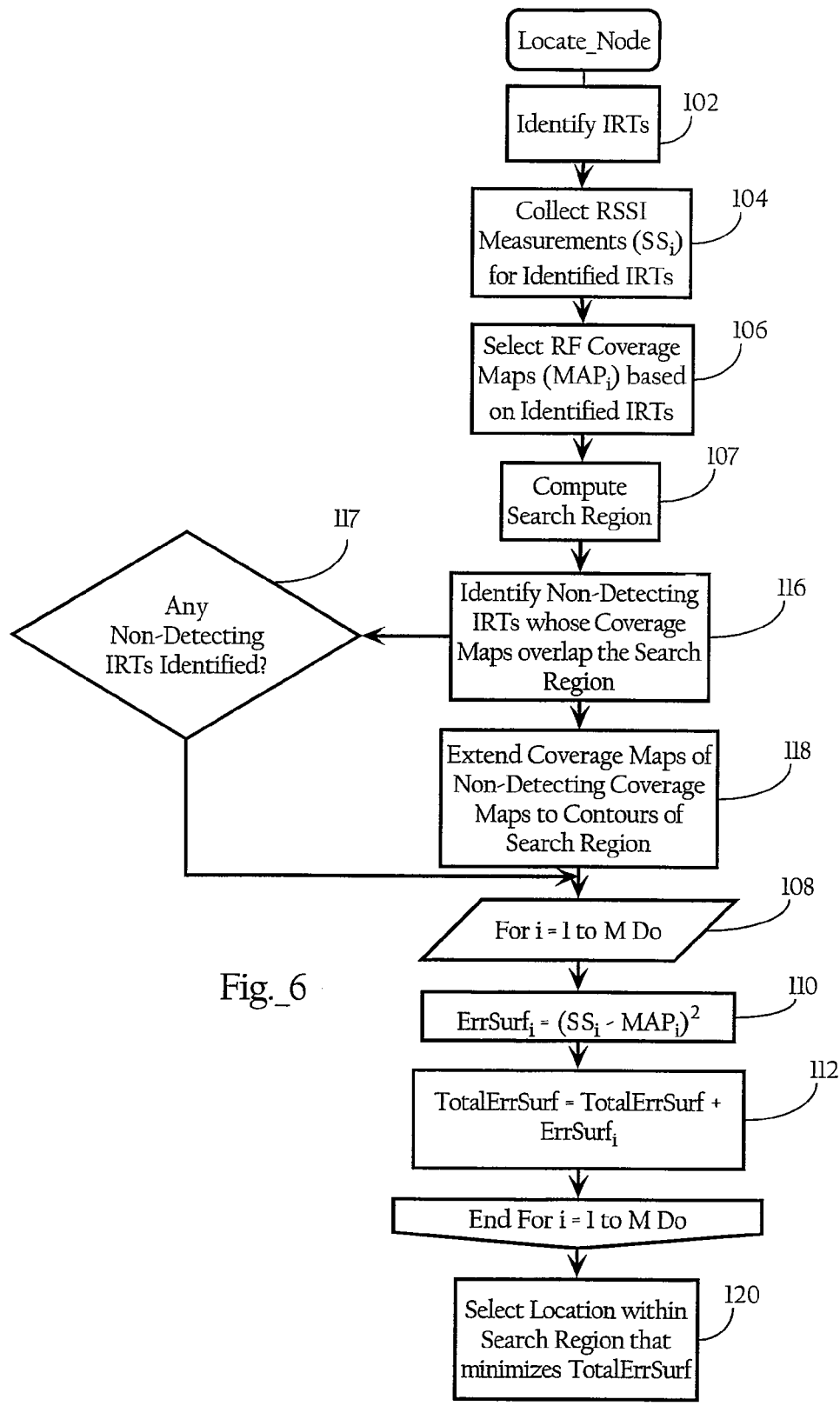
FIG. 6 is a flow chart diagram illustrating the overall process flow directed to estimating the location of a wireless node according to a second embodiment of the present invention.
Figure 7:
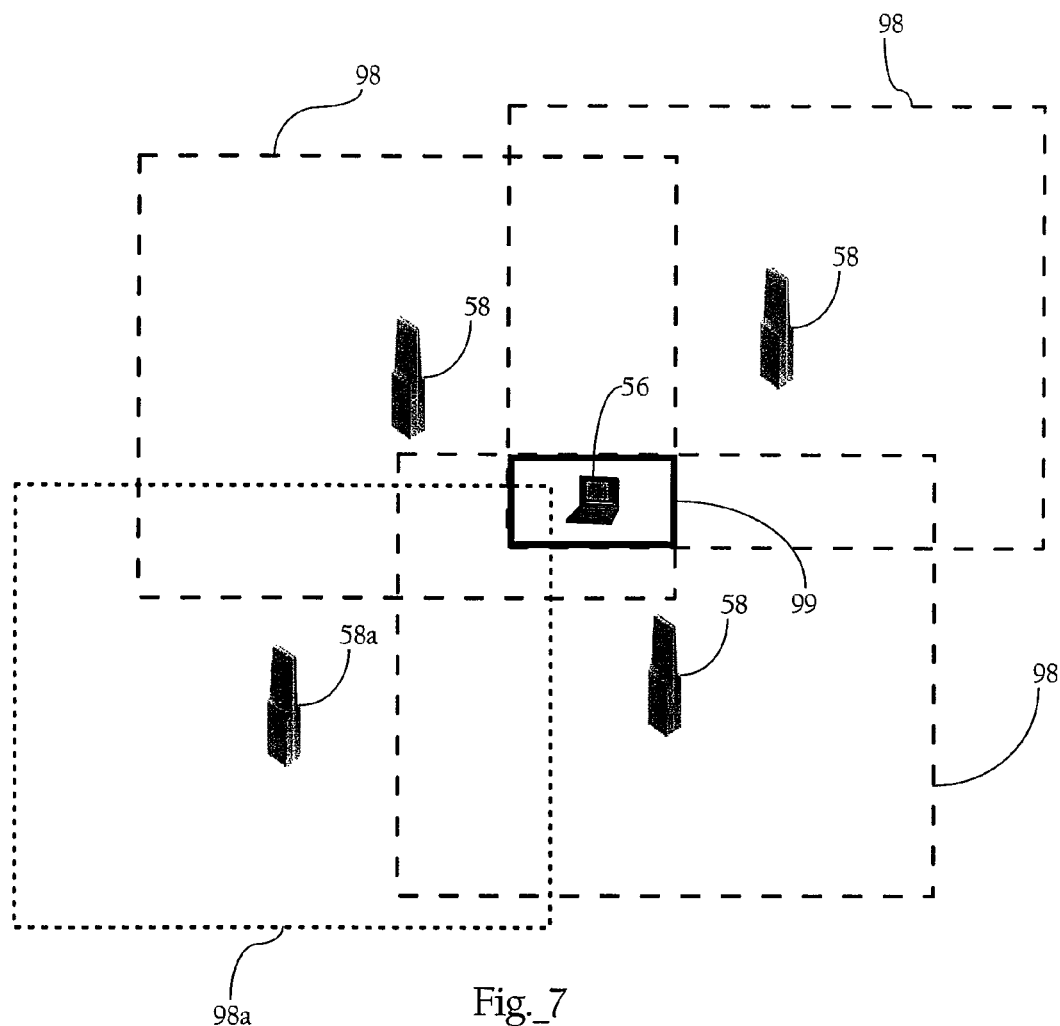
FIG. 7 is a schematic diagram illustrating the definition of a search region according to another implementation of the invention.

FIG. 6 illustrates a method, according to another implementation of the present invention, that incorporates information gleaned from non-detecting infrastructure radio transceivers 58 whose coverage maps overlap the search region. Specifically, as FIG. 6 shows, after the search region is computed based on the infrastructure radio transceivers 58 that detected the wireless node (107), wireless node location module 59 identifies the infrastructure radio transceiver(s) 58 that did not detect the wireless node, and whose corresponding coverage maps overlap the computed search region (116). FIG. 7 graphically illustrates this identification. For example, FIG. 7 illustrates infrastructure radio transceiver 58*a* whose coverage map 98*a* overlaps the computed search region 99 based on the infrastructure radio transceivers 58 that were initially identified. If any non-detecting infrastructure radio transceivers 58 are identified (117), wireless node location module extends the coverage maps corresponding to the identified infrastructure radio transceivers 58 to the contours of the computed search region (118). In one implementation, for areas in the search region 99 outside of the coverage map 98*a*, wireless node location module 59 inserts signal strength values that are equal to or slight less than the radio sensitivity of the infrastructure radio transceiver 58*a*. For example and in one implementation, the inserted value is −95 dBm which generally corresponds to the observed or documented radio sensitivity of various 802.11-compliant access points. Of course, other values can be used depending on the radio sensitivity of the infrastructure radio transceivers 58 employed. Subsequently, wireless node location module 59, for all identified detecting and non-detecting infrastructure radio transceivers 58 (108), computes the total error surface within the search region, as discussed above, to estimate the location of the wireless node.

As discussed above, the present invention yields may efficiencies for wireless node location mechanism, such as smaller database sizes required to store signal strength models, as well as faster query times. For example, assume for didactic purposes a given physical area of 10,000,000 square feet, and a desired model granularity of 10 square feet. Modeling this space in a Radio Map in the RADAR system (see above) yields 1,000,000 location bins, each containing a x,y-coordinate pair, and a tuple of RSSI values for the infrastructure radio transceivers 58 deployed in the physical space. Assuming, for each location bin, that 4 bytes are required for the x-coordinate, 4 bytes for the y-coordinate, 4 bytes for each radio transceiver identifier (e.g., MAC address), and 1 byte to express the RSSI value, 58 Mbytes of data storage capacity is required for a location system including 10 infrastructure radio transceivers for each location bin. In implementations of the present invention, the database capacity requirements are greatly reduced. For example, in the same physical space and granularity discussed above, assume that 2000 infrastructure radio transceivers are deployed at substantially equidistant intervals from one another in the physical space, and that each coverage map corresponds to an area of 2,5000 square feet. If the number of bins in the x- and y-directions requires 2 bytes each, the implementation described above reduces the database size requirement to 5.026 Mbytes (2000 IRTs* (lower x-coordinate (4)+lower y-coordinate (4)+#x-bins (2)+ #y bins(2)+RSSI matrix (25000/10), yielding a 10-fold space savings over the prior art.

In addition, the present invention also reduces query or estimation times. For example, the RADAR system discussed above would require querying 1,000,000 database elements to determine which location bins contain a superset of the list of infrastructure radio transceivers that detected a given wireless node. For this selected set of location bins, the location mechanism must find the location bins that contain the exact set of detecting infrastructure radio transceivers, which can become a complicated query. The present invention, however, first requires querying the 2000 objects corresponding to the detecting infrastructure radio transceivers, compute the resulting search region, and the search for the best fit within the search region, resulting in substantial computational savings and faster response times.

A.2.c. Differential Metric

Figure 8:
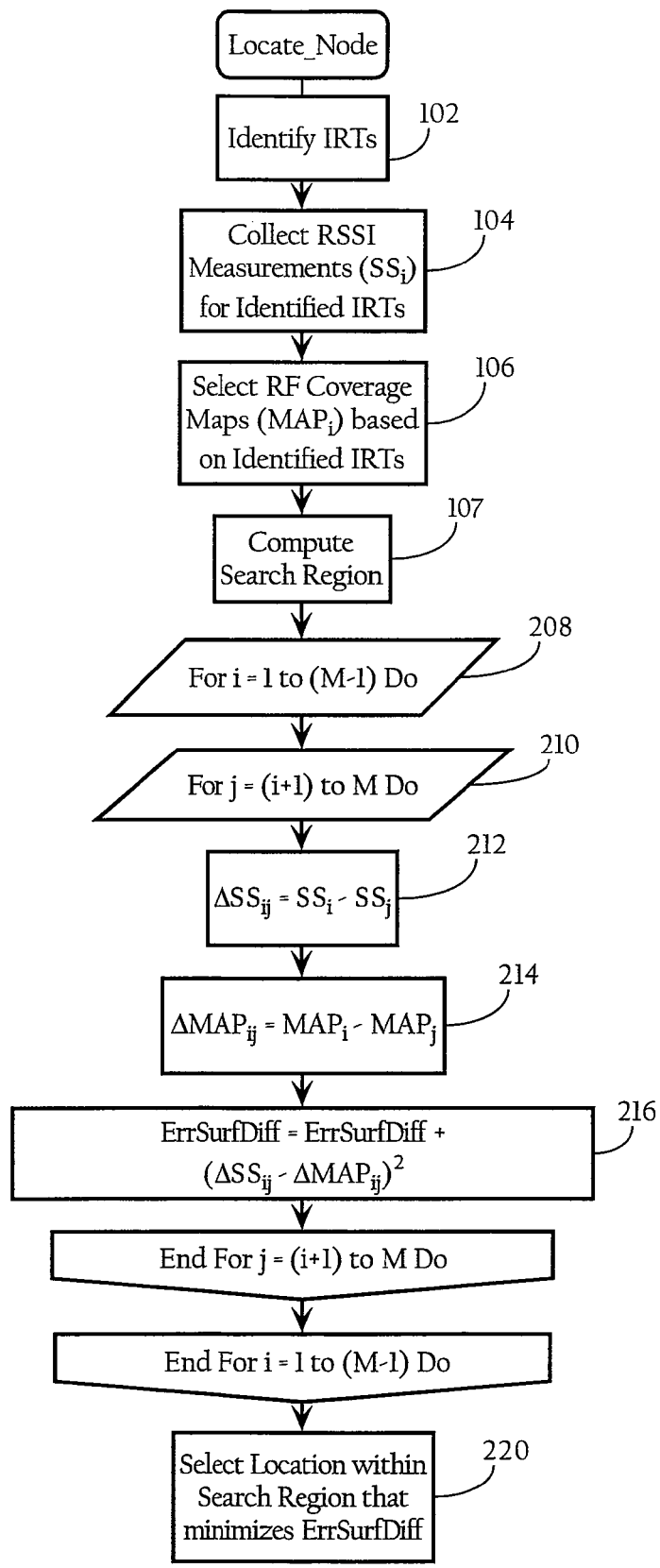
FIG. 8 is a flow chart diagram illustrating the overall process flow, according to another embodiment of the present invention, directed to estimating the location of a wireless node.

Still further, as FIG. 8 illustrates, the search region methodology described herein can be used to optimize a variety of wireless node location computations. FIG. 8 illustrates an alternative implementation of the present invention in which wireless node location module 59 estimates the location of wireless nodes based on the differences in reported signal strength across selected infrastructure radio transceivers 58. As FIG. 8 illustrates, wireless node location module 59, in one implementation, begins by identifying the infrastructure radio transceivers (IRTs) 58 whose signal measurements will be used in locating the desired wireless node (102). In addition, wireless node location module 59 collects signal strength measurements (104), selects RF coverage maps (106), and computes the search region (107) in a manner similar to that described in connection with FIG. 2. Of course, information concerning non-detecting infrastructure radio transceivers 58 can be used in other ways. For example, in another implementation, the area of the coverage map 98*a* that intersects the search region 99 can be used to further restrict the search region. For example, the overlapping portion of coverage map 98*a* may be subtracted from the search region 99.

As FIG. 8 illustrates, wireless node location module 59, computes the difference, $\Delta SS_{ij}$, for each pair of signal strength measurements ($SS_i$ and $SS_j$) among the selected infrastructure radio transceivers 58 (212), as well as the difference, $\Delta MAP_{ij}$, at each point within the search region between the coverage maps ($MAP_i$ and $MAP_j$) corresponding to the selected infrastructure radio transceivers 58 (214). In the case of M selected infrastructure radio transceivers 58, there are M choose 2 or M!/((M−2)! 2!) pairs of differences. Wireless node location module 59 constructs a total difference error surface, ErrSurfDiff, by computing, for each unique pair of infrastructure radio transceivers 58 (see 208, 210), the square of the difference between $\Delta SS_{ij}$ and $\Delta MAP_{ij}$, and adding the contribution from each unique pair to ErrSurfDiff (216). Lastly, to estimate the location of the desired wireless node, wireless node location module 59 selects the location within the search region that minimizes the total difference error surface, ErrSurfDiff (220).

As the foregoing illustrates, wireless node location module 59, in this implementation, essentially searches for the area within the search region between each pair of infrastructure radio transceivers 58 where the detected signal strength is different by X dB, where X dB is the observed difference in the RSSI or other signal strength measurements of the desired wireless node as detected by the two infrastructure radio transceivers. In the ideal case involving no physical barriers are located in the RF environment, the contour where the difference between the two infrastructure radio transceivers 58 predicted signals is a constant X dB can be described by a Cartesian oval. In the practical world, this shape is arbitrary. In the ideal world, summing up several of these create a region of zero error where the Cartesian ovals overlap and non-zero error terms elsewhere. In the real world, the summing up of several of these surfaces create a total error surface, whose minimums represent the most likely location of the wireless node.

To illustrate the benefits of this differential signal strength metric, assume a N dB difference in the transmit power of the wireless node from an assumed or default transmit power. In the case of three selected infrastructure radio transceivers, this N dB difference factors into the total difference error surface as:

ErrSurfDiffTxErr=
(((RSSIap1+N)−(RSSIap2+N))−(MAPap1−
  MAPap2))^2
+ (((RSSIap1+N)−(RSSIap3+N))−(MAPap1−MAPap3))
  ^2
+     (((RSSIap2+N)−(RSSIap3+N))−(MAPap2−
  MAPap3))^2, which reduces to the original ErrSurfDiff with no additional errors added. In addition, the differential signal strength metric also addresses the errors in detecting the strength of wireless signals and errors resulting from assuming path loss symmetry. For example, the absolute power assumed by the coverage maps (e.g., MAPap1, MAPap2) may be incorrect by K dB for each client independently. In this metric, those errors are also removed, as shown in the following:

ErrSurfDiffAPErr=((RSSIap1−RSSIap2)−((MAPap1+
K)−(MAPap2+K)))^2
+((RSSIap1−RSSIap3)−((MAPap1+K)−(MAPap3+K)))
  ^2
+((RSSIap2−RSSIap3)−((MAPap2+K)−(MAPap3+K)))
  ^2, which also reduces to ErrSurfDiff. Accordingly, the differential signal strength metric described herein minimizes the effects of absolute error caused by variations in transmit power, or signal strength detection, as well as lack of symmetry in path loss between a detecting node and a transmitting node.

B. Integration into Wireless Network Systems

Figure 3:
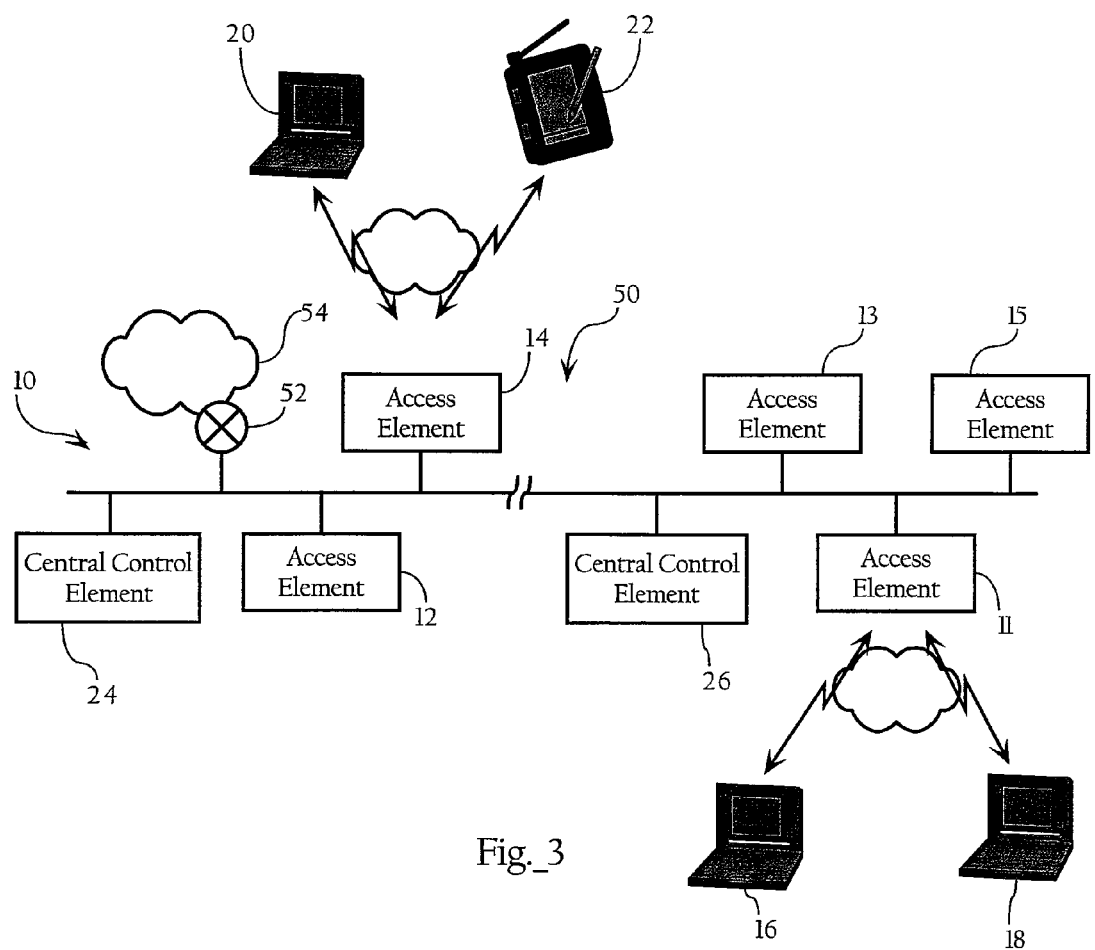
FIG. 3 is a functional block diagram illustrating a wireless network system according to an implementation of the present invention.

In one implementation, the wireless node location functionality discussed above can be integrated into a wireless network infrastructure, such as the hierarchical WLAN system illustrated in FIG. 3. For example, the wireless node location functionality described herein may be integrated into a WLAN environment as disclosed in U.S. application Ser. Nos. 10/155,938 and 10/407,357 incorporated by reference herein. The wireless node location functionality according to the present invention, however, may be applied to other wireless network architectures. For example, the wireless node location functionality may be integrated into a wireless network infrastructure including a plurality of substantially autonomous access points that operate in connection with a central network management system.

Referring to FIG. 3, there is shown a block diagram of a wireless Local Area Network system according to an embodiment of the invention. A specific embodiment of the invention includes the following elements: access elements 11-15 for wireless communication with selected client remote elements 16, 18, 20, 22, central control elements 24, 25, 26, and means for communication between the access elements and the central control elements, such as direct line access, an Ethernet network, such as LAN segment 10. As disclosed in U.S. patent application Ser. No. 10/407,357, the access elements, such as access elements 11-15 are directly connected to LAN segment 10 or a virtual local area network (VLAN) for communication with a corresponding central control element 24, 26. See FIG. 3. As disclosed in U.S. patent application Ser. No. 10/155,938, however, access elements 11-15 may also be directly connected to respective central control elements 24, 26 via direct access lines.

The access elements 11-15 are coupled via communication means using a wireless local area network (WLAN) protocol (e.g., IEEE 802.11a or 802.11b, etc.) to the client remote elements 16, 18, 20, 22. As described in U.S. application Ser. Nos. 10/155,938 and 10/407,357, the access elements 12, 14 and the central control element 24 tunnel network traffic associated with corresponding remote client elements 16, 18; 20, 22 via direct access lines or a LAN segment 10. Central control elements 24, 26 are also operative to bridge the network traffic between the remote client elements 16, 18; 20, 22 transmitted through the tunnel with corresponding access elements 11-15. In another implementation, access elements 11-15 may be configured to bridge the network traffic on LAN segments 10, while sending copies of the bridged frames to the access elements for data gathering and network management purposes.

As described in the above-identified patent applications, central control elements 24, 26 operate to perform data link layer management functions, such as authentication and association on behalf of access elements 11-15. For example, the central control elements 24, 26 provide processing to dynamically configure a wireless Local Area Network of a system according to the invention while the access elements 11-15 provide the acknowledgment of communications with the client remote elements 16, 18, 20, 22. The central control elements 24, 26 may for example process the wireless LAN management messages passed on from the client remote elements 16, 18; 20, 22 via the access elements 11-15, such as authentication requests and authorization requests, whereas the access elements 11-15 provide immediate acknowledgment of the communication of those messages without conventional processing thereof. Similarly, the central control elements 24, 26 may for example process physical layer information. Still further, the central control elements 24, 26, as discussed more fully below, may for example process information collected at the access elements 11-15 on channel characteristics, signal strength, propagation, and interference or noise.

Figure 4:
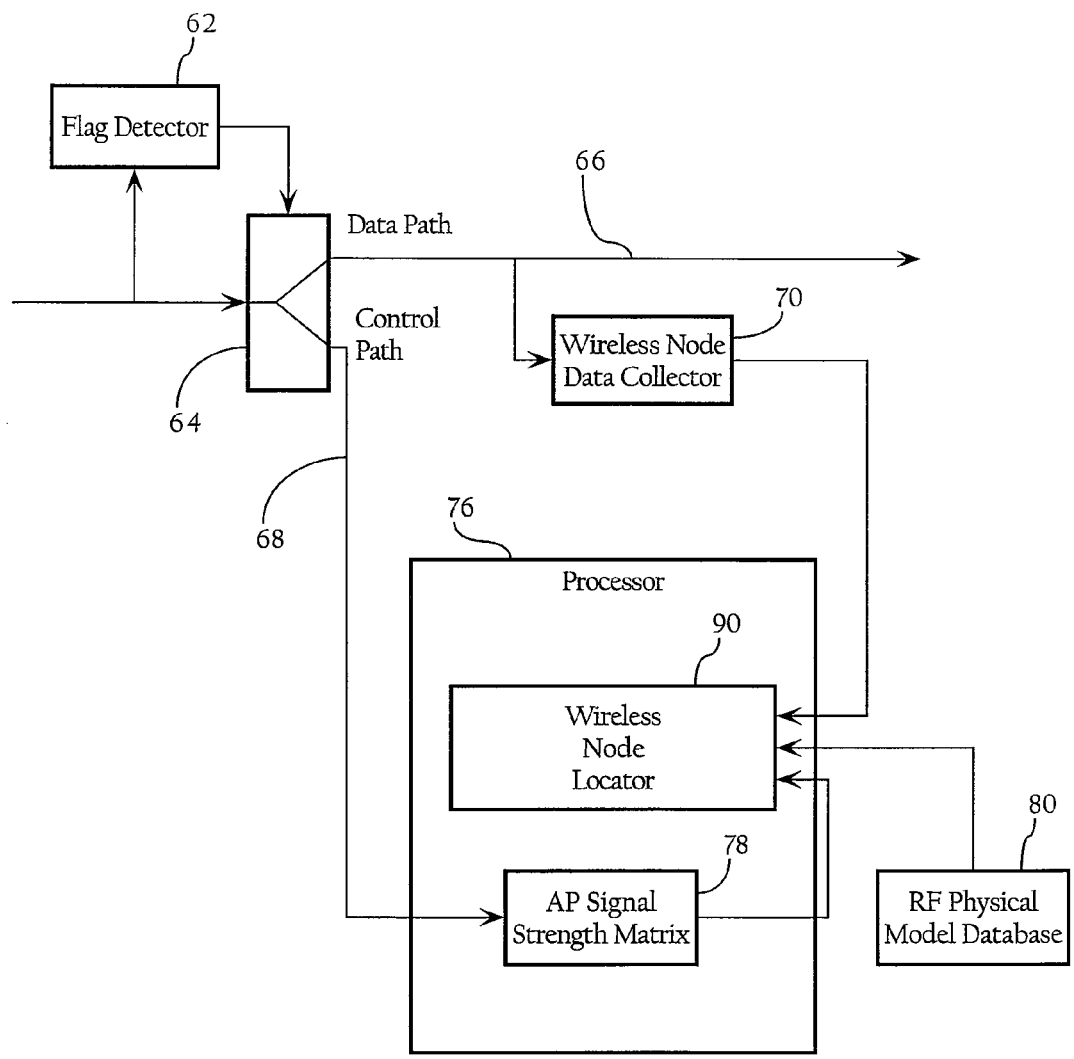
FIG. 4 is a functional block diagram showing the wireless node location functionality of a central control element in the wireless network system of FIG. 3.

Central control elements 24, 26, as shown in FIG. 4, may be configured to gather the signal strength data discussed above to support the wireless node location functionality according to the present invention. The signal strength data gathering functionality described herein is quite similar to the data gathering disclosed in U.S. application Ser. No. 10/183,704, incorporated by reference above. In the system disclosed in that application, access elements 11-15 append signal strength data to packets received from wireless nodes, typically, in encapsulating headers. The central control elements 24, 26 process the encapsulating packet headers to update various data structures, such as the N×N AP signal strength matrix and wireless node tables discussed above in Section A. U.S. application Ser. No. 10/183,704 discloses the internal operating components and general configuration of access elements 11-15 that can be used in connection with the integrated wireless node location functionality described herein.

FIG. 4 illustrates the logical configuration of central control elements 24, 26, according to an implementation of the present invention. As discussed in U.S. application Ser. No. 10/183,704, in one implementation, there is both a logical data path 66 and a control path 68 between a central control element 24 or 26 and an access element (e.g., access element 11). The control path 68 allows the central control element 24 or 26 to communicate with the radio access elements 11-15 and acquire the signal strength between the radio access elements. By monitoring the data path 66, the central control element 24, 26 can obtain the signal strength of the signals transmitted by other wireless nodes.

More specifically, the wireless node locator 90 in the central control element 24 or 26 collects information from a plurality of access elements via a control channel 68 and a data channel 66. The central control element 24 or 26 receives and transmits data packets and control packets from/to a plurality of access elements 11-15 as described above. A flag detector 62 distinguishes between data packets and control packets, routing them through a logical switch 64 to a high-speed data path 66 in communication with the wired network 15 or to control path 68 within the central control element 24 or 26. The data path 66 is monitored by a wireless node data collector 70. Associated with each data packet is a resource management header which contains RF physical layer information, such as the power in the channel before each received packet, an identifier for the access element receiving the signal, as well as an identifier for the antenna selected to receive the signal. This information, together with the 802.11 protocol information in the native frames, can be used to maintain one or more data structures that maintain signal strength data for the wireless nodes detected by the access elements 11-15, as discussed in section A, above. The control path 68 is coupled to a processor element 76 in which an AP signal strength matrix 78 is maintained. The AP signal strength matrix 78 collects information quantifying the signal strength between access elements 11-15. All of the signal strength data are collected at the access elements 11-15 and communicated over the data path and control path to the central control element 24 or 26, in one implementation, as packetized information in the resource management header in the data path and resource management control packets in the control path, respectively.

As discussed above, in one implementation, the wireless node location function uses signal strength data between access elements to select a RF physical model that best characterizes the current RF environment. To support such an implementation, one task is to create and maintain an AP signal strength matrix for all the remote access elements in the various wireless networks which detect each other's signals. This is accomplished, in one implementation, by having the wireless node locator 90 in the central control element 24 or 26 and a Resource Manager in the access elements 11-15 both passively listen to surrounding access elements and actively probe for surrounding access elements. The wireless node locator in the central control element 24 or 26 can schedule an access element 11-15 in the wireless network to transmit a data measurement request on a specified channel and then record responses from surrounding access elements. The data measurement probe request and the receiver information bandwidth can have a narrower information bandwidth than the normal information bandwidth in order to allow the dynamic range of the receiver to be extended beyond its normal operational range. This allows a radio element to "see" access elements beyond its normal operating range. Scheduling these measurements allows multiple measurements to be made with a single transmission and allows the detection of the transmitting signal to be recognized as a change in amplitude relative to the background noise at the scheduled time, allowing for easier detection of the measurement signal and greater dynamic range. The resulting data can be transmitted in control packets collected by AP signal strength matrix 78 on the control path 68. Passively, for each packet received on the data channel at the access element a measurement of the power in the RF channel is made immediately before the received packet. This interference measurement is sent to the central control element via the data channel by appending a Radio Resource Manager header to the data packet. Alternatively, the access elements may be configured to flag packets received from other access elements such that they are transmitted on the control path 68. The AP signal strength data can be used to select from different coverage maps that best characterize the current RF environment, as discussed above. The AP signal strength data can also be used to dynamically compute or adjust the path loss exponent(s) used in the weighting function described above. For example, since the distance between two or more access elements are known, path loss exponent(s) may be computed based on the observed signal attenuation between pairs of access elements.

FIG. 4 also illustrates an RF physical model database 80 containing the one or more coverage maps associated with the access elements 11-15. When activated, the wireless node locator 90 can operate as discussed above to compute the estimated location of a desired wireless node, and return the estimated location to the requesting system, such as a network management system or a control interface. In the WLAN system depicted in FIG. 3, several implementations are possible. For example, central control element 24 may be configured as a "master" central control element for purposes of wireless node location. That is, data collected at all central control elements is ultimately transmitted (either regularly or on demand) from other central control elements (e.g., central control element 26) to the master central control element 24 which computes the estimated location. Alternatively, the collected data can be transmitted to a network management system that performs the location computations discussed above. Alternatively, central control elements 24, 26 (when deployed in separate physical spaces, such as separate floors or buildings) may operate substantially autonomously.

The invention has been explained with reference to specific embodiments. For example, although the embodiments described above operate in connection with 802.11 networks, the present invention can be used in connection with any wireless network environment. Still further, although the embodiments described above compute estimated location based on signal strengths detected by infrastructure access points or elements, the signal strength weighting metric can be used by client wireless nodes, such as mobile stations in the RADAR system. Other embodiments will be evident to those of ordinary skill in the art. It is therefore not intended that the invention be limited except as indicated by the appended claims.

What is claimed is:

1. A method comprising
collecting signal strength values, detected at a plurality of radio receivers, corresponding to Radio Frequency (RF) signals transmitted by a wireless node;
accessing a plurality of RF coverage maps, wherein each RF coverage map corresponds to a radio receiver of the plurality of radio receivers and characterizes signal strength values for locations in a physical region out to a threshold signal strength level;
defining a search region to include only a region that is covered by all of the plurality of RF coverage maps; and
searching for, confined within the defined search region, the estimated location of the wireless node based on the collected signal strength values and the RF coverage maps corresponding to the plurality of radio receivers.

2. The method of claim 1 wherein each RF coverage map comprises an origin location, and a coverage map region defined by a matrix having elements containing signal strength values for corresponding locations in the physical region out to the threshold signal strength level.

3. The method of claim 2 wherein the matrix is an N×M matrix, wherein N is the number of x-coordinates in the RF coverage map, and M is the number of y-coordinates in the RF coverage map; and wherein each element of the matrix corresponds to a unit of area.

4. The method of claim 1 wherein the threshold signal strength value is set to a detection sensitivity of the plurality of radio receivers.

5. The method of claim 1 wherein the searching for the estimated location comprises
computing, for each radio receiver, an individual error surface based on the RF coverage map associated with the radio receiver and the signal strength detected by the radio receiver;
aggregating the individual error surfaces to create a total error surface; and
assessing, within the search region, the total error at each location in the total error surface.

6. The method of claim 5 wherein the computing step further comprises finding within the search region the location of the minimum of the total error surface.

7. The method of claim 5 wherein each individual error surface comprises the sum of the squares of the difference between the signal strength values detected by a radio receiver and the signal strength values in a corresponding RF coverage map.

8. The method of claim 1 further comprising
detecting, at a plurality of radio transceivers, the strength of signals transmitted by a wireless node.

9. The method of claim 1 wherein the RF coverage maps each comprise a plurality of location coordinates associated with corresponding signal strength values.

10. The method of claim 9 wherein the RF coverage maps are heuristically constructed.

11. The method of claim 9 wherein the RF coverage maps are based on a mathematical model.

12. The method of claim 1 wherein the signals transmitted by the wireless nodes are formatted according to a wireless communications protocol.

13. The method of claim 12 wherein the wireless communications protocol is the IEEE 802.11 protocol.

14. The method of claim 1 wherein the contribution of each detected signal strength value to the estimated location is weighted according to a weighting function that varies with the signal strength values detected by the radio receivers.

15. The method of claim 14 wherein the searching for the estimated location comprises
computing, for each radio receiver, an individual error surface based on the RF coverage map associated with the radio receiver and the signal strength detected by the radio receiver;
weighting each of the individual error surfaces according to a weighting function that varies with the signal strength detected by corresponding radio receivers;
aggregating the individual error surfaces to create a total error surface; and
assessing, within the search region, the total error at each location in the total error surface.

16. The method of claim 15 wherein the computing step further comprises finding within the search region the location of the minimum of the total error surface.

17. The method of claim 1 wherein the RF coverage maps are rectangular.

18. The method of claim 17 wherein the aspect ratio of the RF coverage maps correspond to at least one characteristic of the antennas associated with the corresponding radio receivers.

19. An apparatus facilitating the location of a wireless node, comprising
a plurality of radio receivers each comprising at least one antenna, the plurality of radio receivers operative to detect the strength of Radio Frequency (RF) signals transmitted by wireless nodes and provide the detected signal strengths to a wireless node location module; and
a wireless node location module operative to
receive signal strength values, detected at the plurality of radio receivers, corresponding to RF signals transmitted by a wireless node;
access a plurality of RF coverage maps, wherein each RF coverage map corresponds to a radio receiver of the plurality of radio receivers and characterizes signal strength values for locations in a physical region out to a threshold signal strength level;
define a search region to include only a region that is covered by all of the plurality of RF coverage maps; and
search for, confined within the defined search region, the estimated location of the wireless node based on the collected signal strength values and the RF coverage maps corresponding to the plurality of radio receivers.

20. The apparatus of claim 19 wherein each RF coverage map comprises an origin location, and a coverage map region defined by a matrix having elements containing signal strength values for corresponding locations in the physical region out to the threshold signal strength level.

\* \* \* \* \*